United States Patent
Kobayashi et al.

(10) Patent No.: US 10,234,037 B2
(45) Date of Patent: Mar. 19, 2019

(54) DUST SEAL

(71) Applicant: NOK CORPORATION, Tokyo (JP)

(72) Inventors: Naoto Kobayashi, Fukushima (JP); Takuya Kato, Fukushima (JP)

(73) Assignee: NOK CORPORATION, Tokyo (JP)

( * ) Notice: Subject to any disclaimer, the term of this patent is extended or adjusted under 35 U.S.C. 154(b) by 0 days.

(21) Appl. No.: 15/492,383

(22) Filed: Apr. 20, 2017

(65) Prior Publication Data

US 2017/0219100 A1    Aug. 3, 2017

Related U.S. Application Data

(63) Continuation of application No. PCT/JP2015/081125, filed on Nov. 5, 2015.

(30) Foreign Application Priority Data

Nov. 11, 2014   (JP) ................................. 2014-228732

(51) Int. Cl.
*F16J 15/52*    (2006.01)
*F16J 3/04*    (2006.01)
(Continued)

(52) U.S. Cl.
CPC ............... *F16J 15/52* (2013.01); *F16J 3/04* (2013.01); *F16J 15/3204* (2013.01);
(Continued)

(58) Field of Classification Search
CPC .. F16J 15/52; F16J 15/3204; F16J 3/00; F16J 3/04; F16J 3/041; F16J 15/36; F16J 15/54; F16J 15/3224; B62D 1/16
(Continued)

(56) References Cited

U.S. PATENT DOCUMENTS

| | | | |
|---|---|---|---|
| 2002/0113375 A1* | 8/2002 | Ruderman | F16J 15/52 277/389 |
| 2008/0231003 A1* | 9/2008 | Moriyama | B60R 13/0846 277/636 |

(Continued)

FOREIGN PATENT DOCUMENTS

| | | |
|---|---|---|
| CN | 101583814 A | 11/2009 |
| CN | 201824966 U | 5/2011 |

(Continued)

OTHER PUBLICATIONS

International Search Report and Written Opinion from Corresponding Application No. PCT/JP2015/081125; dated Jan. 26, 2016.

(Continued)

*Primary Examiner* — Nathan Cumar
(74) *Attorney, Agent, or Firm* — Pearne & Gordon LLP

(57) ABSTRACT

A dust seal includes an annular dust seal body, an annular bushing through which a shaft is slidably inserted, and an annular seal lip provided on the bushing and slidably contacting the shaft. The dust seal body includes an annular elastic attaching portion that is fitted into an opening of a receiving portion, an annular first accordion unit having an elastic accordion, and an annular second accordion unit having an elastic accordion. The first accordion unit and the second accordion unit are arranged side by side in the direction of an axis. The first accordion unit is integral with the attaching portion, is joined to the attaching portion at an outer periphery, and is bonded to the bushing at an inner periphery by vulcanization. The second accordion unit is fixed to the attaching portion at an outer periphery, and engaged with the bushing at an inner periphery.

6 Claims, 6 Drawing Sheets

(51) Int. Cl.
*F16J 15/3204* (2016.01)
*F16J 15/3224* (2016.01)
*F16J 15/54* (2006.01)
*B62D 1/16* (2006.01)

(52) U.S. Cl.
CPC .......... *F16J 15/3224* (2013.01); *F16J 15/54* (2013.01); *B62D 1/16* (2013.01)

(58) Field of Classification Search
USPC .......................................................... 277/504
See application file for complete search history.

(56) References Cited

U.S. PATENT DOCUMENTS

| | | | | |
|---|---|---|---|---|
| 2010/0133758 | A1* | 6/2010 | Kanzaki | B62D 1/16 277/561 |
| 2011/0142385 | A1 | 6/2011 | Keller | |
| 2017/0219100 | A1* | 8/2017 | Kobayashi | F16H 63/3433 |
| 2017/0234434 | A1* | 8/2017 | Shuto | B62D 1/16 277/504 |

FOREIGN PATENT DOCUMENTS

| | | |
|---|---|---|
| CN | 102119062 A | 7/2011 |
| DE | 102011105449 A1 | 12/2012 |
| EP | 1710147 A1 | 10/2006 |
| EP | 2 088 352 A1 | 12/2009 |
| JP | H09-42467 A | 2/1997 |
| JP | 2001-324018 A | 11/2001 |
| JP | 2008-32208 A | 2/2008 |
| JP | 4987300 B2 | 7/2012 |
| WO | 2005/068277 A1 | 7/2005 |

OTHER PUBLICATIONS

English Translation of Written Opinion from Corresponding Application No. PCT/JP2015/081125; dated Jan. 26, 2016.
International Preliminary Report on Patentability from Corresponding Application No. PCT/JP2015/081125; dated May 16, 2017.
Chinese Office Action dated Jan. 30, 2018 for corresponding Chinese Application No. 201580061459.9 with English translation.
Extended European Search Report dated Apr. 26, 2018 for corresponding European Application No. 15859612.2.
Second office action dated Oct. 15, 2018 in the corresponding Chinese Application No. 201580061459.5 and English translation.

* cited by examiner

DUST SEAL

CROSS REFERENCE TO RELATED APPLICATIONS

The present application is a continuation application of International Application No. PCT/JP2015/081125, filed on Nov. 5, 2015, which claims priority to Japanese Patent Application No. 2014-228732, filed on Nov. 11, 2014. The contents of these applications are incorporated herein by reference in their entirety.

BACKGROUND

Technical Field

The present disclosure relates to a dust seal for preventing entry of foreign matter such as dust, rain, or the like, and particularly relates to a steering dust seal for a steering shaft of a steering device for a car or other vehicles.

Background Art

In a steering device for a vehicle, e.g. a car, a steering shaft is inserted through a column hole opened in the dash panel separating the vehicle interior and the engine room. A gap between the steering shaft and the column hole is sealed with a steering dust seal. The steering dust seal prevents entry of foreign matter such as dust, rain, or the like to the vehicle interior.

FIG. 6 is a cross-sectional view schematically showing the structure of a conventional dust seal. As shown in FIG. 6, a dust seal 100 as a conventional steering dust seal includes a cylindrical bushing 101 made of a low-friction material, a dust seal body 102 made of a rubber, a annular seal lip 103, which is present at an end portion of the bushing 101 adjacent to the engine room, and a attaching member 104.

A steering shaft 130 is inserted through the bushing 101, and the bushing 101 is slidable on the steering shaft 130. The dust seal body 102 includes a first bellows (accordion unit) 105 and a second bellows 106, which project toward the engine room, and a cylindrical attaching portion 107 joined to the end portions of the first and second bellows 105 and 106 on the outer periphery side. A cylindrical metal reinforcing ring 108, which serves as a reinforcement conforming to the shape of the attaching portion 107, is embedded in the attaching portion 107. An inner end portion 105a of the first bellows 105 and an inner end portion 106a of the second bellows 106 are fitted in the outer periphery of an end portion 101a of the bushing 101 adjacent to the vehicle interior.

The attaching member 104 is an annular metal member that has a cross section in a generally L shape fitted in the inner end portion 105a on the inner side so as to cover the inner end portion 105a of the first bellows 105. Since the attaching member 104 is fitted in the inner end portion 105a of the first bellows 105 in this manner, the inner end portion 105a of the first bellows 105 is locked in a direction toward the vehicle interior side and pushed toward the inner periphery side, therefore, the first bellows 105 is fixed to the end portion 101a of the bushing 101 adjacent to the vehicle interior, at the inner end portion 105a. In addition, as shown in FIG. 6, the inner end portion 106a of the second bellows 106 is locked in a direction toward the vehicle interior by the inner end portion 105a of the first bellows 105 fixed as described above, pushed toward the inner periphery side, and fixed to the end portion 101a of the bushing 101 adjacent to the vehicle interior.

The seal lip 103, which is a rubber annular member, is disposed at the end portion 101b of the bushing 101 adjacent to the engine room and is slidably in contact with a surface of the steering shaft 130. The seal lip 103 prevents entry of foreign matter such as rain, dust or the like to a space between the steering shaft 130 and the bushing 101, and leakage of a lubricant on the inner periphery of the bushing 101.

As shown in FIG. 6, in the dust seal 100, the attaching portion 107 of the dust seal body 102 is closely fitted in a column hole 132 of a dash panel 131 for fixation to the column hole 132 of the dash panel 131. Hence, entry of foreign matter such as rain, dust or the like in the gap between the dust seal 100 and the column hole 132 is prevented (for example, see Japanese Patent No. 4987300).

With this structure in the conventional dust seal 100, the bushing 101 is movable with the first and second bellows 105 and 106 relatively to the dash panel 131 (the column hole 132). The steering shaft 130 is tilted or displaced and moves relatively to the column hole 132 due to adjustment of the handle level or vibrations occurring while the car is running. However, the bushing 101 movable relatively to the column hole 132 can follow the movement of the steering shaft 130. This maintains the position of the seal lip 103 and thus works for ensuring prevention of entry of foreign matter such as rain, dust, or the like from the engine room to the vehicle interior.

In the conventional dust seal 100, the bushing 101 is separated from the first bellows 105 and the second bellows 106, resulting in a large number of components and a complex assembly process of the conventional dust seal 100. In addition, the first bellows 105 and the second bellows 106 are attached to the bushing 101 by fitting the attaching member 104, so that adequate attaching strength is not provided and the deviation or vibration of the steering shaft 130 may unlock the mounting member 104 and remove the fixation between each of the first bellows 105 and the second bellows 106 and the bushing 101. Even if the attaching member 104 does not come off, loosened fixation between each of the first bellows 105 and the second bellows 106 and the bushing 101 prevents the bushing 101 and thus the seal lip 103 from staying in their proper positions, and there may be a problem with a decrease in sealing performance between the seal lip 103 and the steering shaft 130.

The present disclosure is related to providing a dust seal which can be made with a simple assembly process and exhibits high joint strength between the bushing and each accordion unit.

SUMMARY

According to an aspect of the present disclosure, a dust seal for sealing a gap between an opening in a receiving member and a shaft inserted through the opening, may include: a dust seal body in an annular shape centered about an axis; a bushing in an annular shape centered about the axis, through which the shaft is slidably inserted; and a seal lip in an annular shape centered about the axis, provided at one end of the bushing in a direction of the axis, and slidably contacting an outer peripheral surface of the shaft. The dust seal body may include: an attaching portion that is fitted into the opening of the receiving portion, is in an annular shape centered about the axis, and is made of an elastic material, a first accordion unit that has an accordion made of an elastic material and is an annular shape centered about the axis, and a second accordion unit that has an accordion made of an elastic material and is an annular shape centered about the axis. The first accordion unit and the second accordion unit are arranged side by side in the direction of the axis. The first accordion unit is integral with the attaching portion, is joined to an inner peripheral surface of the attaching portion at an outer periphery, and is bonded to an outer peripheral surface of the bushing at an inner periphery by vulcanization. The second accordion unit is fixed to the inner peripheral surface of the attaching portion at an outer periphery, and engaged with the outer peripheral surface of the bushing at an inner periphery.

In the dust seal according to one aspect of the present disclosure, the second accordion unit is integral with the attaching portion and joined to the inner peripheral surface of the attaching portion at the outer periphery.

In the dust seal according to one aspect of the present disclosure, the second accordion unit is fitted into the inner peripheral surface of the attaching portion at the outer periphery and to thereby be fixed to the attaching portion.

In the dust seal according to one aspect of the present disclosure, the bushing includes a first engaging part extending in an annular shape along the outer peripheral surface, the second accordion unit includes an annular second engaging part at an end portion on the inner periphery, and the second accordion unit is locked to the outer peripheral surface of the bushing with the first engaging part and the second engaging part engaged with each other.

In the dust seal according to one aspect of the present disclosure, the first engaging part includes a depression that extends in an annular shape along the outer peripheral surface of the bushing and that is depressed in the direction of the axis or toward the axis, the second engaging part includes a projection that extends in an annular shape at an end portion on the inner periphery of the second accordion unit and that projects in the direction of the axis, the projection of the second engaging part is accommodated in and engaged with the depression of the first engaging part, and the second accordion unit is locked to the outer peripheral surface of the bushing.

In the dust seal according to one aspect of the present disclosure, the bushing includes, at an end portion on a second accordion unit side in the direction of the axis, a tapered portion with a taper surface spreading from the end portion side toward an end portion side opposite to the end portion side.

A dust seal according to the present disclosure can be made with a simple assembly process and exhibits high joint strength between the bushing and each accordion unit.

DETAILED DESCRIPTION

Embodiments according to the present disclosure will now be described with reference to the drawings.

Figure 1:
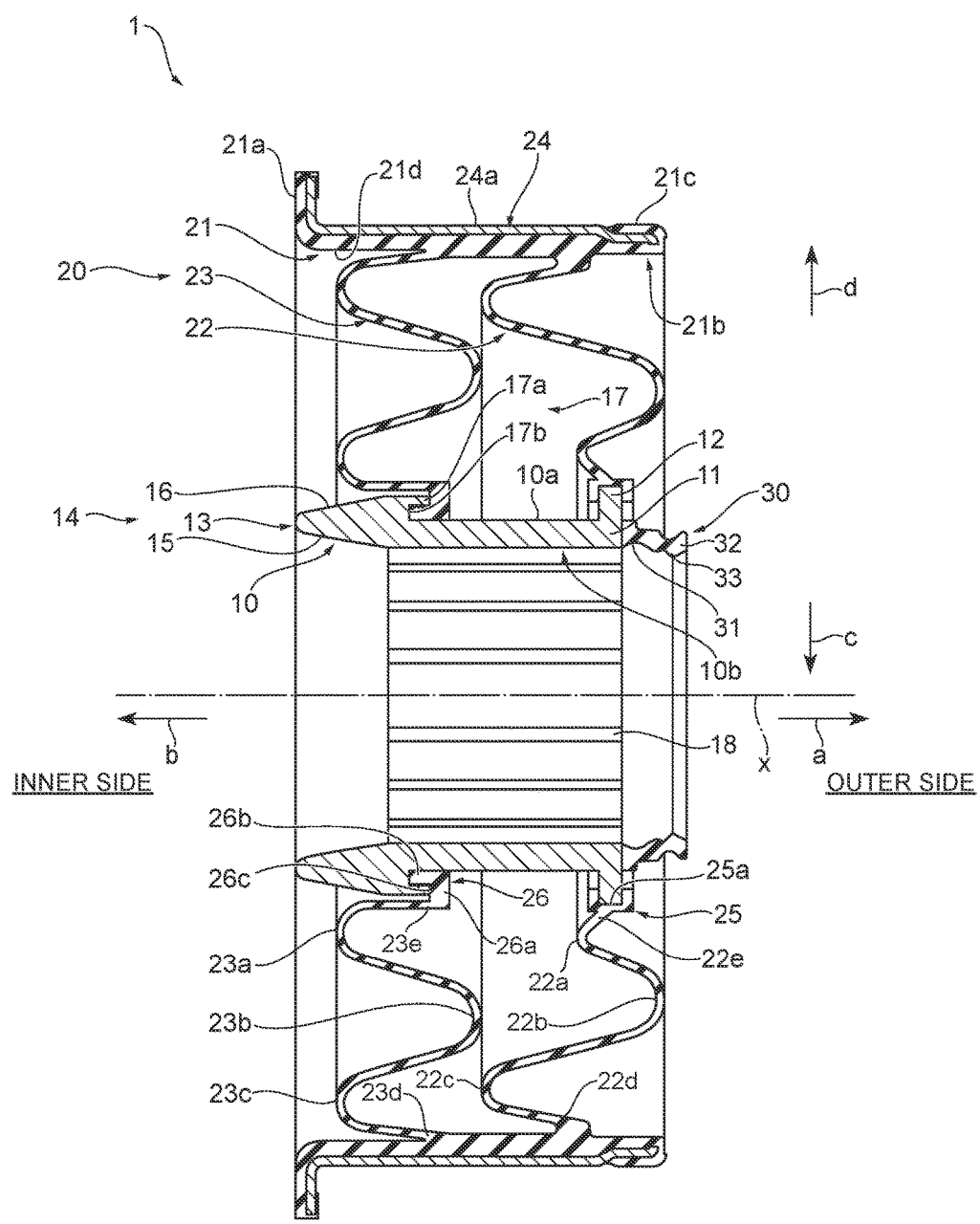
FIG. 1 is a cross-sectional view along an axis, showing a schematic structure of a dust seal according to a first embodiment of the present disclosure.

FIG. 1 is a cross-sectional view along an axis, showing a schematic structure of a dust seal according to a first embodiment of the present disclosure.

As shown in FIG. 1, a dust seal 1 according to the first embodiment of the present disclosure has an annular shape centered about an axis x and includes a bushing 10, a dust seal body 20, and a seal lip 30. Hereinafter, as shown in FIG. 1, the direction indicated by the arrow a in the direction of the axis x is referred to as the outer side or the engine room side, and the direction indicated by the arrow b in the direction of the axis x is referred to as the inner side or the vehicle interior side. The direction (indicated by the arrow c) getting closer to the axis x in the direction vertical to the axis x (hereinafter also referred to as the radial direction) is referred to as the inner periphery side, and the direction (indicated by the arrow d) getting further away from the axis x in the vertical direction to the axis x is referred to as the outer periphery side.

The bushing 10 has an annular shape, specifically a cylindrical shape, having the axis x at its center and is made of a low-friction material. Since a shaft is slidably inserted through the bushing 10 in a usage state as described later, the bushing 10 has an inner diameter corresponding to the outer diameter of the shaft inserted therethrough. An annular projection 12, projecting toward the outer periphery side, is provided on the outer peripheral surface of an end portion 11 which is the end portion of the bushing 10 on the outer side. The projection 12 extends on throughout the outer peripheral surface of the end portion 11, forming a flange on the end portion 11. The projection 12 functions as an engaging part as described later. Instead of the projection 12 extending on throughout the outer peripheral surface of the end portion 11, a plurality of projections may be arranged at intervals in the circumferential direction in the form of an arc on a part of the periphery. Alternatively, the projections 12 may be positioned more on the inner side than the end portion 11 in the direction of the axis x at a predetermined interval.

The bushing 10 also includes a tapered portion 14 at an end portion 13 which is the end portion on the inner side and opposite the end portion 11. The tapered portion 14 includes a taper surface 15 which is a circular conical surface formed on the inner peripheral surface of the end portion 13 and having a diameter decreasing toward the outer side in the direction of the axis x; and a taper surface 16 which is a circular conical surface formed on the outer peripheral surface of the end portion 13 and having a diameter increasing toward the outer side in the direction of the axis x. As shown in FIG. 1, the end portion 13 projects to the outer periphery side further than an outer peripheral surface 10a between the end portions 11 and 13 of the bushing 10, and is thicker than the portion between the end portions 11 and 13 of the bushing 10.

As shown in FIG. 1, the bushing 10 includes an engaging part 17 at the edge of the end portion 13 on the outer periphery side and the outer side. The engaging part 17 includes an annular projection 17a projecting toward the outer side. The projection 17a faces the outer peripheral surface 10a of the bushing 10 in the radial direction, forms an annular depression 17b depressed toward the inner side in the direction of the axis x between the projection 17a and the outer peripheral surface 10a of the bushing 10.

A lubricant such as a grease or the like is applied to the inner peripheral surface 10b of the bushing 10 on which a shaft (not shown in the drawing) slides. To hold the lubricant, a plurality of trenches 18, extending in the direction of the axis x, is disposed at equal angular intervals in the circumferential direction. The trenches 18 should not necessarily be in the form of straight lines and may be in the helical, wave, or ring form, for example. Alternatively, a single trench 18 may be formed. The trenches 18 hold the lubricant on the inner peripheral surface 10b of the bushing 10 to allow the shaft to be smoothly slidable for a long period of time. Note that the bushing 10 should not necessarily include the trenches 18.

The bushing 10 is made of a low-friction material as described above. Examples of the low-friction material include hard resin materials and metal materials. Examples of the resin materials include polyamide resins, polytetrafluoroethylene resins and the like. Examples of the metal materials include aluminum and the like.

The dust seal body 20 includes an attaching portion 21, a first bellows (first accordion unit) 22, and a second bellows (second accordion unit) 23. The attaching portion 21 has an annular shape centered about the axis x, specifically a cylindrical shape, and is fitted in the opening in a receiving member as described later. The first bellows 22 has an annular shape centered about the axis x and is specifically a generally circular hollow disc shape and has portions depressed and projecting in the direction of the axis x. Similarly, the second bellows 23 has an annular shape centered about the axis x and is specifically a generally circular hollow disc shape and has portions depressed and projecting in the direction of the axis x. The first bellows 22 and the second bellows 23 are arranged side by side in the direction of the axis x, and the first bellows 22 is disposed further on the outer side than the second bellows 23. The first and second bellows 22 and 23 make the bushing 10 movable and their side-by-side arrangement gives sound insulation effects. The attaching portion 21, the first bellows 22, and the second bellows 23 are integrally formed from the same elastic material, e.g. rubber. The dust seal body 20 includes a metal reinforcing ring 24 in an annular shape centered about the axis x.

As shown in FIG. 1, the attaching portion 21 has a flange 21a at the end portion of the attaching portion 21 on the inner side, and an outer peripheral surface 21c, which is the surface on the outer periphery side, exposed at an end portion 21b which is the end portion on the outer side.

The reinforcing ring 24 is made of a metal, for example, stainless steel, steel SPCC (cold rolled steel sheet), or other metals, has a shape corresponding to the attaching portion 21, and is attached to the outer periphery side of the attaching portion 21. The reinforcing ring 24 may be at least partly embedded in the attaching portion 21. In this embodiment, the reinforcing ring 24 is embedded in the outer periphery side of the attaching portion 21 such that its end portion on the outer side is embedded in and covered with the outside end portion 21b of the attaching portion 21, and the surface of its other portion on the outer periphery side is exposed.

When the dust seal 1 is fitted in the opening in the receiving portion, the outer peripheral surface 21c of the outer end portion 21b of the attaching portion 21 and an outer peripheral surface 24a, which is the surface on the outer periphery side of the reinforcing ring 24, come in close contact with the inner peripheral surface of the opening, thus sealing the gap between the receiving portion and the dust seal 1 as described later.

The first bellows 22 has concave and convex portions in the direction of the axis x and these concave and convex portions extend in a ring shape centered about the axis x, thereby forming an accordion elastic in the direction of the axis x and the radial direction. In particular, the first bellows 22 includes, in sequence from the inner periphery side, an annular convex portion 22a, which is convex toward the inner side, an annular concave portion 22b, which joins to the convex portion 22a on the outer periphery side and is concave toward the outer side, and an annular convex portion 22c, which joins to the concave portion 22b on the outer periphery side and is convex toward the inner side. These convex portions 22a and 22c and the concave portion 22b form the accordion. The first bellows 22 joins to an inner peripheral surface 21d, which is the inner peripheral surface of the attaching portion 21, at its end portion on the outer periphery side, i.e. at an end portion 22d, which is the end portion of the convex portion 22c on the outer periphery side.

Moreover, the first bellows 22 has an engaging part 25 at its end portion on the inner periphery side, i.e. at an end portion 22e, which is the end portion of the convex portion 22a on the inner periphery side. As shown in FIG. 1, the engaging part 25 is an annular member having a generally U-shaped cross-section along the axis x (hereinafter simply referred to as cross-section) opened toward the inner periphery side. To be specific, the engaging part 25 includes an annular depression 25a depressed toward the outer periphery side. The depression 25a can accommodate the projection 12 of the bushing 10. In the dust seal 1, the projection 12 is accommodated in the depression 25a, the depression 25a is engaged with the projection 12, and the engaging part 25 is locked to the projection 12. Moreover, the engaging part 25 is bonded to the projection 12 by vulcanization. To be specific, the dust seal body 20 is molded by vulcanization as described later. In the step of molding by vulcanization, the bushing 10 is placed in a mold, the first bellows 22 is molded in a state where the engaging part 25 is engaged with the projection 12 of the bushing 10 as described above, and the engaging part 25 and the projection 12 are bonded to each other by vulcanization.

Similarly to the first bellows 22, the second bellows 23 has concave and convex portions in the direction of the axis x and these concave and convex portions extend in a ring shape centered about the axis x, thereby forming an accordion elastic in the direction of the axis x and the radial direction. In particular, the second bellows 23 includes, in sequence from the inner periphery side, an annular convex portion 23a, which is convex toward the inner side, an annular concave portion 23b, which joins to the convex portion 23a on the outer periphery side and is concave toward the outer side, and an annular convex portion 23c, which joins to the concave portion 23b on the outer periphery side and is convex toward the inner side. These convex portions 23a and 23c and the concave portion 23b form the accordion. The second bellows 23 joins to the inner peripheral surface 21d of the attaching portion 21 at its end portion on the outer periphery side, i.e. at an end portion 23d, which is the end portion of the convex portion 23c on the outer periphery side.

Moreover, the second bellows 23 has an engaging part 26 at its end portion on the inner periphery side, i.e. at an end portion 23e, which is the end portion of the convex portion 23a on the inner periphery side. As shown in FIG. 1, the engaging part 26 includes a circular disc 26a, which projects toward the inner periphery side from the end portion 23e and is a hollow circular disc in a flange form, and an annular projection 26b projecting toward the inner side from the end portion of the circular disc 26a on the inner periphery side. In the engaging part 26, the projection 26b faces the convex portion 23a in the radial direction in the vicinity of the end portion 23e, thereby forming an annular depression 26c depressed toward the outer side between the projection 26b and the convex portion 23a.

As shown in FIG. 1, in the dust seal 1, the engaging part 26 of the second bellows 23 is engaged with the engaging part 17 of the bushing 10, so that the second bellows 23 is locked and fixed to the bushing 10 at the engaging parts 17 and 26. To be specific, the projection 26b of the engaging part 26 of the second bellows 23 is configured to be able to be accommodated in the depression 17b of the engaging part 17 of the bushing 10. The projection 17a of the engaging part 17 of the bushing 10 is configured to be able to be accommodated in the depression 26c of the engaging part 26 of the second bellows 23. The projection 26b is accommodated in the depression 17b. The projection 17a is accommodated in the depression 26c. Thus, the engaging part 26 is locked to the engaging part 17. By the locking between the engaging part 26 and the engaging part 17, the second bellows 23 is joined to the bushing 10. In this manner, the second bellows 23 is configured to be able to be joined to the bushing 10 at the engaging part 26 in a simple way and in a state in which the second bellows 23 and the bushing 10 do not easily disengage.

As described above, the end portion 13 of the bushing 10 has the tapered portion 14, and the taper surface 16 on the outer periphery side has a circular conical surface with a diameter expanding from the inner side toward the engaging part 17. Accordingly, when the bushing 10 is inserted in the second bellows 23 from the end portion 13 and then the engaging part 26 of the second bellows 23 is engaged with the engaging part 17 of the bushing 10 as described above, the engaging part 26 can slide on the taper surface 16, thereby to allow the bushing 10 to be smoothly inserted in the second bellows 23. This facilitates engagement of the engaging part 26 of the second bellows 23 with the engaging part 17 of the bushing 10.

As described later, the first bellows 22 and the second bellows 23, in the usage state, are repeatedly expanded and contracted radially in a direction from the direction of the axis x to the radial direction such that the bushing 10 follows the movement of the shaft. For this reason, to the attaching portion 21, the first bellows 22, and the second bellows 23, fatigue resistance is required in addition to flexibility. Further, to the first bellows 22 and the second bellows 23, ozone resistance is also required. The rubber material for the attaching portion 21, the first bellows 22, and the second bellows 23 is ethylene-propylene rubber, for example.

The accordion shape (the convex portions 22a and 22c and the concave portion 22b) of the first bellows 22 should not necessarily be the above-described shape and may be any shape allowing expansion and contraction in a direction from the direction of the axis x to the radial direction. The shapes of the engaging part 25 of the first bellows 22 and the projection 12 of the bushing 10 should not necessarily be the above-described shapes and may be any shapes that can be engaged with each other.

Similarly, the accordion shape (the convex portions 23a and 23c and the concave portion 23b) of the second bellows 23 should not necessarily be the above-described shape and may be any shape allowing expansion and contraction in a direction from the direction of the axis x to the radial direction. The shapes of the engaging part 26 of the second bellows 23 and the engaging part 17 of the bushing 10 should not necessarily be the above-described shapes and may be any shapes that can be engaged with each other. For example, instead of the projection 26b of the engaging part 26 of the second bellows 23 extending in the circumferential direction throughout the periphery, a plurality of projections may be provided at intervals of equal angles in the circumferential direction in the form of an arc on a part of the periphery. Similarly, the projection 17a of the bushing 10 may include a plurality of projections provided at intervals of equal angles in the circumferential direction corresponding to the plurality of projections of the second bellows 23.

The seal lip 30 is an annular rubber component centered about the axis x, and the end portion 31, which is its end portion on the inner side, is joined to the end portion 11 of the bushing 10 at the surface of the edge portion 31 on the outer side by vulcanization. The seal lip 30 is in a generally conical tubular shape the diameter of which decreases from the inner side toward the outer side and includes, at the end portion 32 which is the end portion on the outer side, an annular lip tip 33 with a wedge-shaped cross section projecting toward the inner periphery side. As described later, the lip tip 33 is configured to make close contact with and to be slidable on the outer peripheral surface of the shaft inserted through the bushing 10 so that the inside of the bushing 10 is sealed in the usage state.

To the seal lip 30, therefore, sealing performance between the seal lip and the shaft such as wear resistance, heat resistance, following ability, and other abilities are required. To the seal lip 30, durability against, for example, muddy water (muddy water resistance) and an ability to restrain noise due to the off-center shaft (noise resistance) are required. For this reason, the seal lip 30 is made of a rubber suitable for sealing the sliding portion, different from rubbers for the attaching portion 21 and the first and second bellows 22 and 23. Examples of the rubber for the seal lip 30 include synthetic rubbers such as nitrile rubber (NBR), hydrogenated nitrile rubber (H—NBR), acrylic rubber (ACM), fluoro-rubber (FKM), and the like.

As described above, in the dust seal 1 according to the embodiment of the present disclosure, the first bellows 22 and the bushing 10 are joined to each other at the projection 12 and the engaging part 25 by vulcanization bonding. This provides high bonding strength between the first bellows 22 and the bushing 10.

In the dust seal body 20, the attaching portion 21, the first bellows 22, and the second bellows 23 are integrally formed from the same material. This provides high strength at the joint between the first bellows 22 and the attaching portion 21 (the end portion 22d) and the joint between the second bellows 23 and the attaching portion 21 (the end portion 23d).

The attaching portion 21, the first bellows 22, and the second bellows 23 are separated from the seal lip 30 and therefore it is possible to choose a material having high fatigue resistance different from sealing performance required to the seal lip 30.

Consequently, in the dust seal 1 according to the embodiment of the present disclosure, the attaching portion 21, the first bellows 22, and the second bellows 23 have high strength against the above-described expansion and contraction movement, resulting in improved fatigue resistance against repeated expansion and contraction due to the movement of the bushing 10.

In the dust seal 1 according to the embodiment of the present disclosure, the seal lip 30 is joined to the bushing 10 by vulcanization bonding, which provides high bonding strength between the seal lip 30 and the bushing 10. The seal lip 30 can be made of a rubber suitable for sealing a sliding portion, unlike a rubber material for the dust seal body 20, thereby improving the sealing performance of the seal lip 30. This also improves the durability of the seal lip 30.

A method of manufacturing the dust seal 1 having the above structure will now be explained. The explanation for components that are manufactured by a known method will be omitted.

In the dust seal body 20, the attaching portion 21, the first bellows 22, and the second bellows 23 are integrally formed from the same rubber. In particular, the attaching portion 21, the first bellows 22, and the second bellows 23 are integrally molded by vulcanization of the same rubber. In the molding by vulcanization, the bushing 10 and the reinforcing ring 24 formed into the shapes described above by a known method are placed in a mold, and then, the reinforcing ring 24 is bonded to the attaching portion 21 by vulcanization and the bushing 10 is bonded to the first bellows 22 by vulcanization. To be specific, the reinforcing ring 24 is embedded in the attaching portion 21 and bonded thereto by vulcanization in the state where the end portion of the reinforcing ring 24 on the outer side is covered by the end portion 21b of the attaching portion 21 and the surface of the other portion of the reinforcing ring 24 on the outer periphery side is exposed. The engaging part 25 of the first bellows 22 is molded and bonded to the projection 12 of the bushing 10 by vulcanization in the manner in which the engaging part 25 is engaged with the projection 12.

Figure 2:
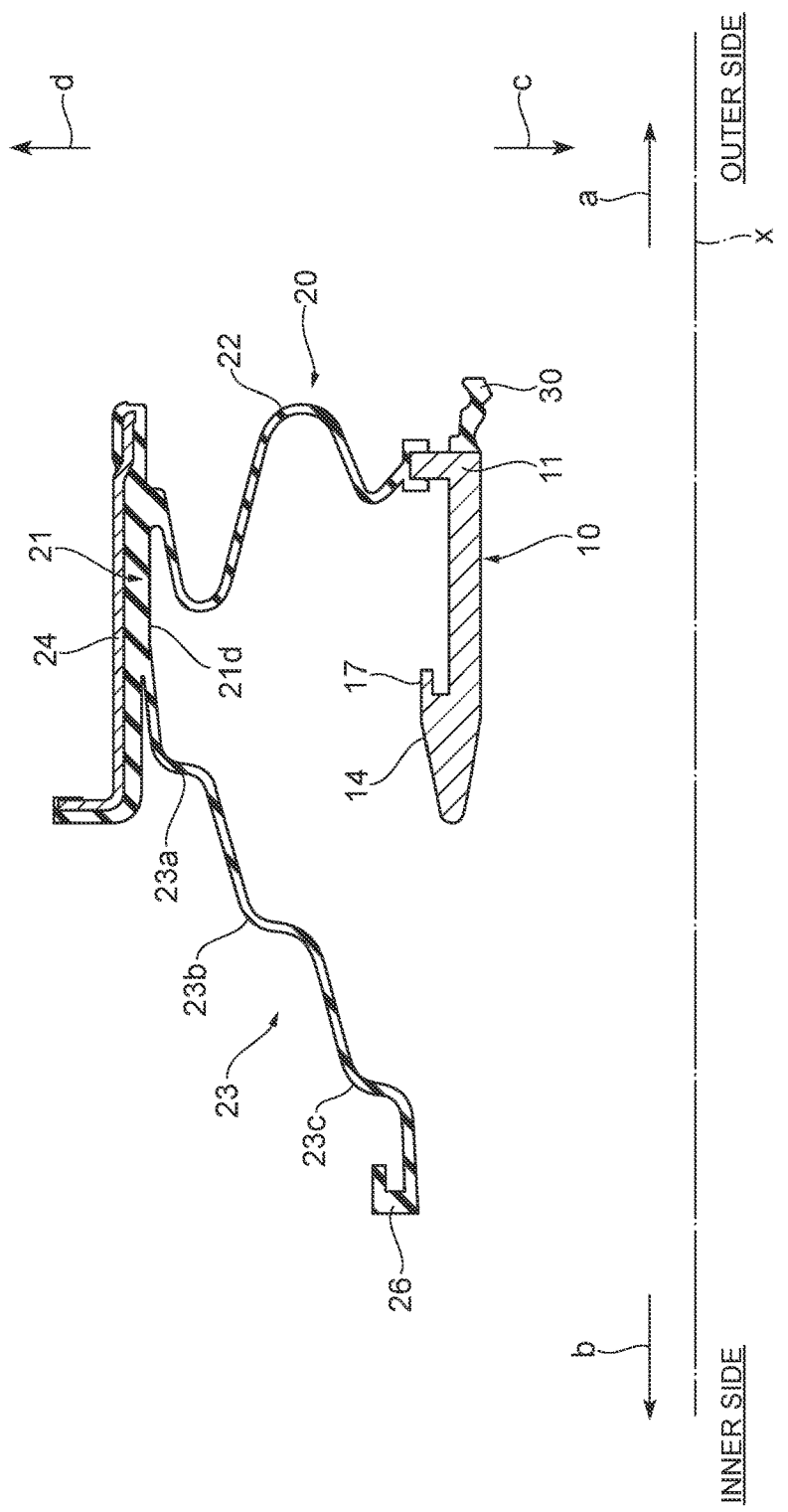
FIG. 2 is a partial cross-sectional view showing a state before a second bellows is engaged with a bushing in the dust seal according to the first embodiment of the present disclosure.

FIG. 2 is a partial cross-sectional view showing the state before the second bellows 23 is engaged with the bushing 10. To be specific, FIG. 2 shows the state of the dust seal body 20 and the bushing 10 molded by vulcanization.

As shown in FIG. 2, the first bellows 22 and the attaching portion 21 are molded by vulcanization into the same shape as in the completed dust seal 1 in FIG. 1. Meanwhile, as shown in FIG. 2, the second bellows 23 molded by vulcanization has a shape extending toward a direction away from the first bellows 22. In particular, the second bellows 23 is formed in such a shape that it extends diagonally from the inner peripheral surface 21d of the attaching portion 21 toward the inner periphery side and the inner side. After the second bellows 23 is molded by vulcanization, the shapes of the convex portions 23a and 23c and the concave portion 23b does not have the shape in the completed product. Thus, the shape of the second bellows 23 after the molding by vulcanization facilitates release from the mold. After the second bellows 23 is locked to the bushing 10, the second bellows 23 has the completed shape with the convex portions 23a and 23c and the concave portion 23b as shown in FIG. 1.

The seal lip 30 is formed at the end portion 11 of the bushing 10 by the vulcanization molding. The molding of the seal lip 30 may be performed either concurrently with the molding of the dust seal body 20, before the molding of the dust seal body 20, or after the molding of the dust seal body 20. Since the rubber for the seal lip 30 is different from that for the attaching portion 21 and the first and second bellows 22 and 23 as described above, the molds for the dust seal body 20 and the seal lip 30 are not in communication with each other.

Consequently, the second bellows 23 in the state shown in FIG. 2 is locked to the bushing 10, so that the second bellows 23 is joined to the bushing 10, thereby completing the dust seal 1. To be specific, the second bellows 23 is curved and the engaging part 26 is engaged with the engaging part 17 of the bushing 10, thereby forming the convex portions 23a and 23c and the concave portion 23b in the second bellows 23 as shown in FIG. 1. Since the bushing 10 has the tapered portion 14 at the end portion 13 as described above in the step of engagement of the engaging parts 17 and 26, the engagement step is simplified.

In the dust seal 1, the first and second bellows 22 and 23, the attaching portion 21, the bushing 10, and the seal lip 30 are one component, resulting in a small number of components and a removal of a complex assembly process. Thus, the process for assembly of the dust seal 1 is simple.

Figure 3:
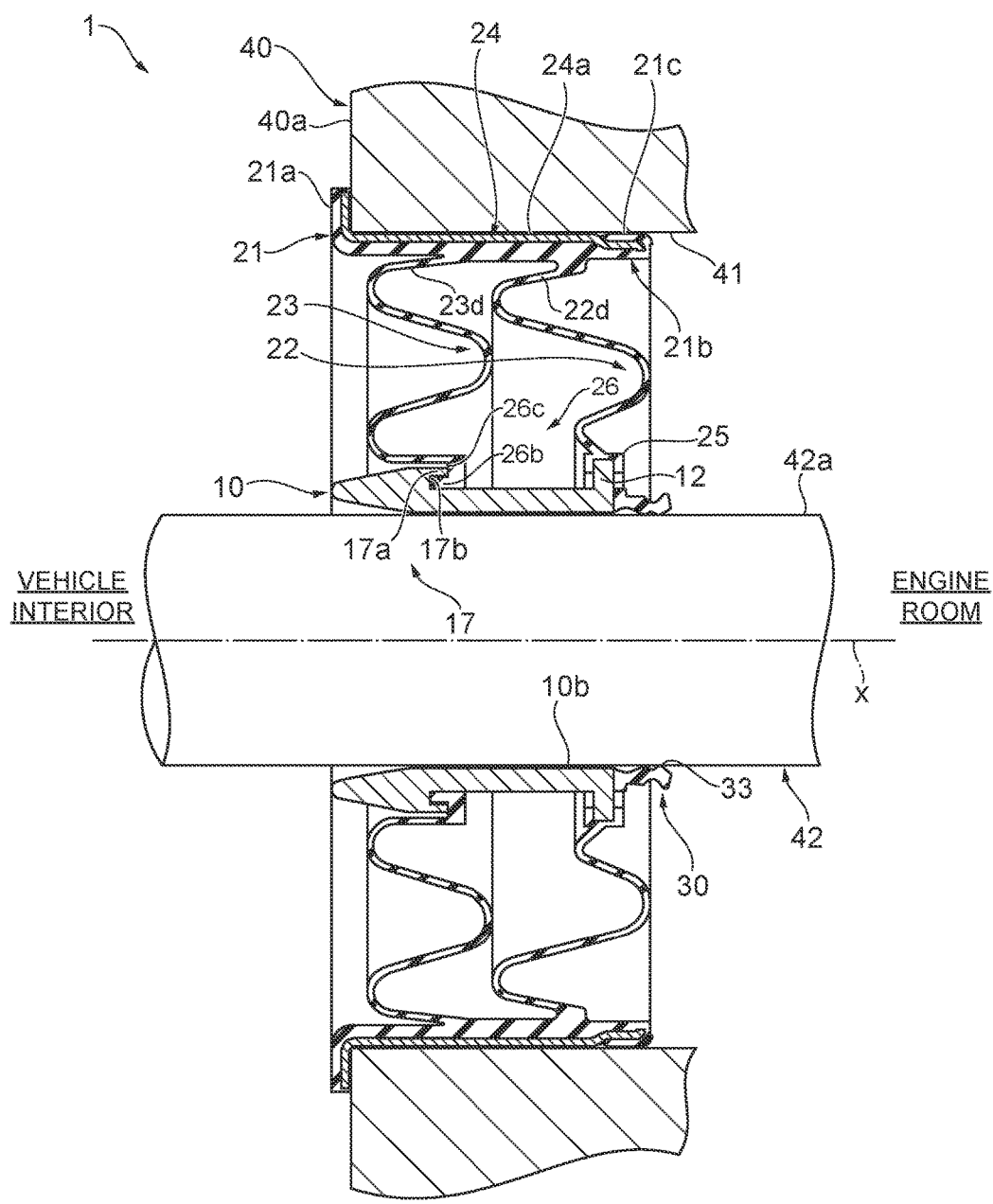
FIG. 3 is a partial cross-sectional view showing a usage state of the dust seal according to the first embodiment of the present disclosure.

The usage state of the dust seal 1 having the structure described above will now be described. FIG. 3 is a partial cross-sectional view showing the usage state of the dust seal 1 according to the first embodiment of the present disclosure. The dust seal 1 according to this embodiment is supposed to be used as a steering dust seal in a steering device of a vehicle, e.g. a car.

As shown in FIG. 3, the dust seal 1 is attached to a column hole 41 opened in a dash panel 40 separating the vehicle interior and the engine room, in order to seal the gap between a steering shaft 42, which is inserted through the column hole 41, and the column hole 41. The dust seal 1 prevents foreign matter such as dust, rain, or the like from entering the vehicle interior.

The dust seal 1 is fixed to the dash panel 40 with the attaching portion 21 fitted into the column hole 41 with predetermined interference. The outer peripheral surface 21c of the end portion 21b of the attaching portion 21 and the outer peripheral surface 24a of the reinforcing ring 24 are in close contact with the column hole 41, thereby sealing the gap between the dash panel 40 and the dust seal 1. The flange 21a of the attaching portion 21 is in contact with a vehicle interior side surface 40a, which is a surface of the dash panel 40 on the vehicle interior side, so that the dust seal 1 is positioned in the direction of the axis x.

The steering shaft 42 is inserted through the bushing 10 and the steering shaft 42 is slidably supported by the inner peripheral surface 10b of the bushing 10. Since the bushing 10 supports the steering shaft 42 with the inner peripheral surface 10b extending lengthwise in the direction of the axis x, the bushing 10 can follow the movement of the steering shaft 42 and keep a stable position with respect to the steering shaft 42 even if the steering shaft 42 is largely off-center. This can keep a proper position of the seal lip 30 contacting the steering shaft 42. A lubricant (not shown in the drawing) is applied to the inner peripheral surface 10b of the bushing 10, which enables smooth sliding of the steering shaft 42. The outer peripheral surface 42a of the steering shaft 42 is in close contact with the lip tip 33 of the seal lip 30, thereby sealing the gap between the steering shaft 42 and the bushing 10 from the engine room.

In this manner, the attaching portion 21 and the seal lip 30 seal the gap between the column hole 41 and the steering shaft 42, thereby preventing foreign matter such as dust, rain, or the like from entering the vehicle interior.

The steering shaft 42 is tilted or displaced and moves relative to the column hole 41 due to adjustment of the handle level and vibrations occurring while the car is running. Accordingly, with the movement of the steering shaft 42, the bushing 10 moves relative to the column hole 41. With the movement of the bushing 10, the first bellows 22 and the second bellows 23 expand and contract. This expansion and contraction of the first and second bellows 22 and 23 repeatedly applies load to the joint between the first bellows 22 and the bushing 10. As described above, the first bellows 22 and the bushing 10 are strongly joined to each other by vulcanization bonding at the projection 12 and the engaging part 25, thereby providing high durability against load repeatedly applied to the joint between the first bellows 22 and the bushing 10 and restraining the release of the joint between the first bellows 22 and the bushing 10.

The attaching portion 21, the first bellows 22, and the second bellows 23 are integrally formed from the same material, thereby increasing the strength at the joint (the end portion 22d) between the first bellows 22 and the attaching portion 21 and the joint (the end portion 23d) between the second bellows 23 and the attaching portion 21, therefore, it is possible to increase the durability of the dust seal 1 against the load repeatedly applied to the joints.

At the engaging parts 26 and 17 of the second bellows 23 and the bushing 10, the projections 26b and 17a are accommodated in and engaged with the depressions 17b and 26c, respectively, so that the second bellows 23 and the bushing 10 are joined to each other, thereby increasing the strength of the joint between the second bellows 23 and the bushing 10. This increases the durability of the dust seal 1 against the load repeatedly applied to the joint.

In the dust seal body 20, for the attaching portion 21, the first bellows 22, and the second bellows 23, a material with high fatigue resistance is selected, thereby increasing the durability of the attaching portion 21, the first bellows 22, and the second bellows 23 against load repeatedly applied to the attaching portion 21, the first bellows 22, and the second bellows 23.

In this manner, in the dust seal 1 according to the embodiment, the bonding strength of the joint between each of the first and second bellows 22 and 23 and the bushing 10 and the bonding strength of the joint between each of the first and second bellows 22 and 23 and the attaching portion 21 are increased, and by the selection of the material for the dust seal body 20 the fatigue resistance is increased. Hence, the fatigue resistance against repeated expansion and contraction of the dust seal body 20 caused by the movement of the bushing 10 can be improved, whereby damage to the dust seal body 20 due to the movement of the bushing 10 can be restrained.

Hence, even in the event of an impact to the bushing 10, the risk of the detachment of the bushing 10 from the dust seal body 20 can be sufficiently reduced, the ability of the bushing 10 to follow the steering shaft 42 can be maintained, and the position of the seal lip 30 with respect to the steering shaft 42 can be maintained at the proper position. Therefore, it is possible to improve the sealing performance of the seal lip 30 and maintain the sealing performance for a long period of time.

As described above, for the dust seal 1 according to the present embodiment, the assembly process can be simplified and the bonding strength between the bushing 10 and each of the first and second bellows 22 and 23 can be increased.

Figure 4:
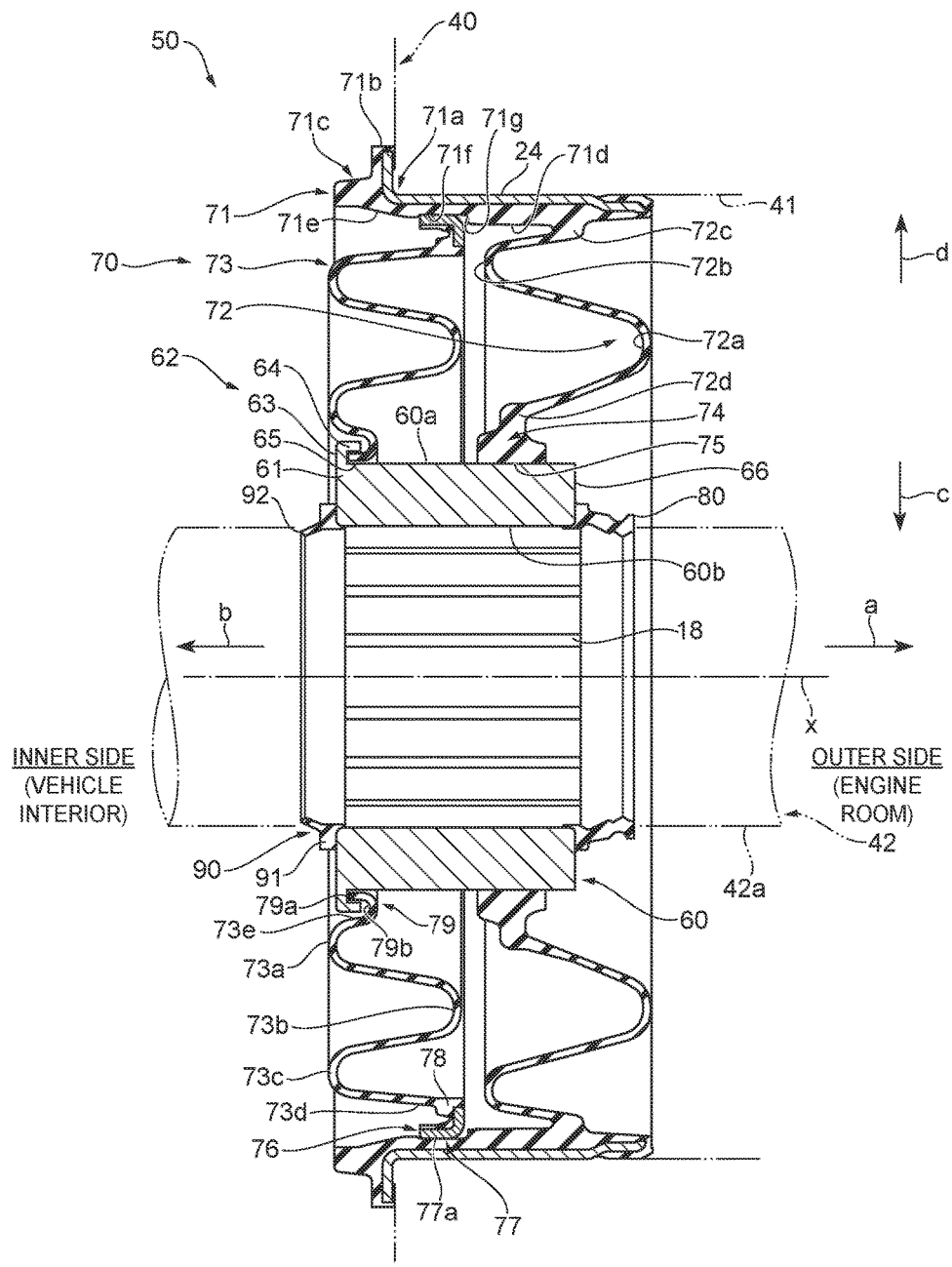
FIG. 4 is a cross-sectional view along an axis, showing a schematic structure of a dust seal according to a second embodiment of the present disclosure.

The second embodiment of the present disclosure will now be described. FIG. 4 is a cross-sectional view along the axis, showing the schematic structure of a dust seal according to the second embodiment of the present disclosure. Hereinafter, the description of a component having a function that is the same as or similar to that of any component in the dust seal 1 according to the first embodiment of the present disclosure will be omitted and these components will be denoted by the same reference numeral as that corresponding component.

As shown in FIG. 4, a dust seal 50 according to the second embodiment of the present disclosure has an annular shape centered about an axis x and includes a bushing 60, a dust seal body 70, a main seal lip 80, and a sub seal lip 90.

The bushing 60 has an annular shape centered about the axis x, specifically a cylindrical shape, and includes an engaging part 62 at an end portion 61 which is the end portion of the bushing 60 on the inner side. The engaging part 62 includes a hollow circular disc 63, which projects toward the outer periphery direction from the end portion 61 and is in a flange form, and an annular projection 64, which projects toward the outer side from the end portion of the hollow circular disc 63 on the outer periphery side. The projection 64 faces an outer peripheral surface 60a of the bushing 60 in the radial direction, thereby forming an annular depression 65 depressed toward the inner side in the direction of the axis x between the projection 64 and the outer peripheral surface 60a. The bushing 60 includes trenches 18 on the inner peripheral surface 60b like the bushing 10 of the dust seal 1. The bushing 60 is made of a low-friction material like the bushing 10 of the dust seal 1.

The dust seal body 70 includes an attaching portion 71, a first bellows (first accordion unit) 72, and a second bellows (second accordion unit) 73. The attaching portion 71 and the first bellows 72 are integrally formed from the same elastic material, e.g. rubber. The dust seal body 70 includes a metal reinforcing ring 24 in an annular shape centered about the axis x, like the dust seal body 20 of the dust seal 1.

As shown in FIG. 4, an end portion 71a, which is the end portion of the attaching portion 71 on the inner side, has a flange 71b projecting toward the outer periphery direction and an annular projection 71c projecting toward the inner direction. The portion lying from the inner peripheral surface of the projection 71c to the vicinity of the end portion 71a of the inner peripheral surface 71d of the attaching portion 71 has a taper surface 71e which has a diameter decreasing toward the outer side in the direction of the axis x. A cylindrical retention surface 71f extending in the direction of the axis x is continuous with the taper surface 71e. The retention surface 71f extends until a step portion 71g that extends in the radial direction. The step portion 71g is a surface like a hollow circular disc and lies between the retention surface 71f and the inner peripheral surface 71d of the attaching portion 71.

Similarly to the first bellows 22 of the dust seal 1, the first bellows 72 has concave and convex portions in the direction of the axis x and these concave and convex portions extend in an annular shape centered about the axis x and form an accordion elastic in a direction from the axis x direction to the radial direction. In particular, the first bellows 72 includes, in sequence from the inner periphery side, an annular concave portion 72a, which is concave toward the outer side, and an annular convex portion 72b, which joins to the concave portion 72a on the outer periphery side and is convex toward the inner side. These concave portion 72a and the convex portion 72b form the accordion. Moreover, the first bellows 72 joins to the inner peripheral surface 71d of the attaching portion 71, at its end portion on the outer periphery side, i.e. at an end portion 72c, which is the end portion of the convex portion 72b on the outer periphery side.

Moreover, the first bellows 72 has a contact portion 74 at its end portion on the inner periphery side, i.e. at an end portion 72d, which is the end portion of the depression 72a on the inner periphery side. As shown in FIG. 4, the contact portion 74 is an annular portion centered about the axis x and has a cylindrical surface 75 in a cylindrical shape about the axis x on the inner side of the contact portion 74. The cylindrical surface 75 is entirely in close contact with the outer peripheral surface 60a of the bushing 60. The contact portion 74 is bonded to the outer peripheral surface 60a of the bushing 60 at the cylindrical surface 75 by vulcanization.

The accordion shape of the first bellows 72 may be the accordion shape of the first bellows 22 of the dust seal 1 (the convex portions 22a and 22c and the concave portion 22b) or any other shape allowing expansion and contraction in a direction from the axis x direction to the radial direction. The first bellows 72 may include the engaging part 25 of the first bellows 22 instead of the contact portion 74. In this case, the bushing 60 includes the projection 12 of the bushing 10 of the dust seal 1.

As shown in FIG. 4, unlike the second bellows 23 of the dust seal 1, the second bellows 73 is not integrally formed with the attaching portion 71 but formed as a separate part, and is fitted and fixed between the bushing 60 and the attaching portion 71 in the dust seal 50 as described later. The second bellows 73 has concave and convex portions in the direction of the axis x and these concave and convex portions extend in an annular shape centered about the axis x, and form an accordion elastic in a direction from the axis x direction to the radial direction. In particular, the second bellows 73 includes, in sequence from the inner periphery side, an annular convex portion 73a, which is convex toward the inner side direction, an annular concave portion 73b, which joins to the convex portion 73a on the outer periphery side and is concave toward the outer side direction, and an annular convex portions 73c, which joins to the concave portion 73b on the outer periphery side and is convex toward the inner side direction. These convex portions 73a and 73c and the concave portion 73b form the accordion. It should be noted that the accordion shape of the second bellows 73 may have a different shape elastic in a direction from the axis x direction to the radial direction.

The second bellows 73 has a fitting part 76 at its end portion on the outer periphery side, i.e. at an end portion 73d, which is the end portion of the convex portion 73a on the outer periphery side. The fitting part 76 includes a fitting ring 77 having an annular shape centered about the axis x and an L-shaped cross section. As shown in FIG. 4, the fitting ring 77 has, on the outer periphery side, a fitting surface 77a which is a cylindrical surface. The fitting ring 77 is fitted to and held on the retention surface 71f of the attaching portion 71 at the fitting surface 77a as described later. The fitting part 76 includes a holder 78 for holding the fitting ring 77. The shape of the holder 78 may be any shape that can hold the fitting ring 77. The fitting ring 77 is made of a metal, for example, stainless steel, SPCC (cold rolled steel sheet), or other metals.

Moreover, the second bellows 73 has an engaging part 79 at its end portion on the inner periphery side, i.e. at an end portion 73e, which is the end portion of the projection 73c on the inner periphery side. As shown in FIG. 4, the engaging part 79 is an annular part extending in a U shape from the end portion 73e, is an annular part centered about the axis x having a U-shaped cross section opened toward the inner side. As shown in FIG. 4, the engaging part 79 can be engaged with the engaging part 62 of the bushing 60 in such a manner that its end portion on the inner periphery side, i.e. a tip 79a is accommodated in a depression 65 of the engaging part 62 of the bushing 60. In this manner, with the engaging part 79, the end portion 73e of the second bellows 73 on the inner periphery side can easily be locked and fixed to the bushing 60.

As shown in FIG. 4, in the dust seal 50, the second bellows 73 is fitted and fixed between the bushing 60 and the attaching portion 71. In particular, the tip 79a of the engaging part 79 of the inner periphery side of the second bellows 73 is accommodated in the depression 65 of the engaging part 62 of the bushing 60, the projection 64 of the engaging part 62 is accommodated in a depression 79b of the engaging part 79, and the engaging part 62 and the engaging part 79 are engaged with each other, so that the second bellows 73 is locked to the bushing 60 through the engaging parts 79 and 62. The second bellows 73 is held in such a manner that the fitting part 76 on the outer periphery side is fitted to the retention surface 71f of the attaching portion 71. The fitting surface 77a of the fitting ring 77 of the fitting part 76 is in close contact with the retention surface 71f. The fitting ring 77 is in contact with the step portion 71g of the attaching portion 71 and positioned in the direction of the axis x.

As described above, the projection 71c and the taper surface 71e are formed in the end portion 71a of the attaching portion 71, and the taper surface 71e has a circular conical surface having a diameter decreasing from the inner side toward the retention surface 71f. Hence, the fitting part 76 of the second bellows 73 can smoothly slide on the taper surface 71e to the retention surface 71f, which allows the fitting part 76 to be easily fitted to the attaching portion 71. Therefore, the assembly of the second bellows 73 can be simplified when the engaging part 79 is first engaged with the bushing 60 and the fitting part 76 is then fitted to the attaching portion 71.

Like the first bellows 22 of the dust seal 1, to the first bellows 72, in addition to flexibility, fatigue resistance is required, and ozone resistance is also required, and made of, for example, ethylene-propylene rubber. The second bellows 73 is made of the same material as the first bellows 72.

The main seal lip 80 has the same mode as the seal lip 30 of the dust seal 1 and is joined to the outer-side surface of the end portion 66, which is the end portion of the bushing 60 on the outer side, by vulcanization bonding. The main seal lip 80 is made of the same material as the seal lip 30 and has sealing performance between the main seal lip 80 and the shaft such as wear resistance, heat resistance, following ability, and other abilities, and has muddy water resistance, and noise resistance.

The sub seal lip 90 is a rubber component in an annular shape centered about the axis x, and its end portion on the outer side, i.e. an end portion 91, is joined to the end portion 61 of the bushing 60 on the outer side surface of the end portion 61. The sub seal lip 90 has a conical tubular shape the diameter of which decreases from the outer side toward the inner side and has a lip tip 92 at the end portion on the inner side. The lip tip 92 is configured to make close contact with and be slidable on the outer peripheral surface of the shaft inserted through the bushing 60 for sealing of the inside of the bushing 60 from the inner side in the usage state.

To the sub seal lip 90, similarly to the main seal lip 80, sealing performance between the sub seal lip 90 and the shaft such as wear resistance, heat resistance, following ability, and other abilities is required, muddy water resistance, and noise resistance are also required. For this reason, like the main seal lip 80, as the rubber material of the sub seal lip 90, a rubber suitable for sealing the sliding portion is used. For example, a synthetic rubber such as nitrile rubber (NBR), hydrogenated nitrile rubber (H—NBR), acrylic rubber (ACM), fluoro-rubber (FKM), and the like, is used.

As described above, in the dust seal 50 according to the second embodiment of the present disclosure, the first bellows 72 is joined to the bushing 60 at the contact portion 74 by vulcanization bonding. Therefore, the bonding strength between the first bellows 72 and the bushing 60 can be heightened.

In the dust seal body 70, the attaching portion 71 and the first bellows 72 are integrally formed from the same material. Therefore, the strength of the joint (end portion 72*c*) between the first bellows 72 and the attaching portion 71 can be heightened.

The attaching portion 71, the first bellows 72, and the second bellows 73 are separated from the main seal lip 80 and the sub seal lip 90 and therefore a material with high fatigue resistance, which is different from sealing performance required to both of the seal lips 80 and 90, can be selected.

Consequently, in the dust seal 50 according to the embodiment of the present disclosure, the attaching portion 71, the first bellows 72, and the second bellows 73 are highly resistant against the above-described expansion and contraction, resulting in improved fatigue resistance against repeated expansion and contraction due to the movement of the bushing 60.

In the dust seal 50 according to the embodiment of the present disclosure, the main seal lip 80 and the sub seal lip 90 are joined to the bushing 60 by vulcanization bonding, which provides high bonding strength between each of the seal lips 80 and 90 and the bushing 60. As the rubber material of the main seal lip 80 and the sub seal lip 90, differently from the rubber material of the dust seal body 70, a rubber suitable for sealing the sliding portion can be used, therefore, the sealing performance of the seal lips 80 and 90 can be improved. The durability of the seal lips 80 and 90 can also be improved.

A method of manufacturing the dust seal 50 having the structure described above will now be described. It should be noted that the description of parts manufactured by a known method will be omitted.

In the dust seal body 70, the attaching portion 71 and the first bellows 72 are integrally formed from the same rubber. In particular, the attaching portion 71 and the first bellows 72 are integrally molded by vulcanization of the same rubber. In the molding by vulcanization, the bushing 60 and the reinforcing ring 24 molded into the shapes described above by a known method are placed in a mold in which the reinforcing ring 24 is bonded to the attaching portion 71 and the bushing 60 is bonded to the first bellows 72 by vulcanization. In particular, the contact portion 74 of the first bellows 72 is molded by vulcanization in a state in which the contact portion 74 contacts the outer peripheral surface 60*a* of the bushing 60 and is bonded thereto by vulcanization.

Like the molding of the seal lip 30, the main seal lip 80 is formed at the end portion 66 of the bushing 60 by vulcanization molding. The molding of the main seal lip 80 may be performed either concurrently with the molding of the attaching portion 71 and the first bellows 72, before the molding of the attaching portion 71 and the first bellows 72, or after the molding of the attaching portion 71 and the first bellows 72.

Like the molding of the main seal lip 80, the sub seal lip 90 is formed at the end portion 61 of the bushing 60 by vulcanization molding. The molding of the sub seal lip 90 may be performed either concurrently with the molding of the attaching portion 71 and the first bellows 72, before the molding of the attaching portion 71 and the first bellows 72, or after the molding of the attaching portion 71 and the first bellows 72. The molding of the sub seal lip 90 may be, but is not necessarily, performed concurrently with the main seal lip 80.

The second bellows 73 is molded by vulcanization. During this molding by vulcanization, the fitting ring 77 preformed by a known method is placed in a mold, so that the second bellows 73 is molded with the fitting ring 77, which is integral with the second bellows 73.

As described above, the molded second bellows 73 is fixed between the bushing 60 and the attaching portion 71 in such manner that the engaging part 79 is engaged with the engaging part 62 of the bushing 60 and the fitting part 76 is fitted to the retention surface 71*f* of the attaching portion 71; thus, the dust seal 50 is completed. Since the attaching portion 71 has the taper surface 71*e* as described above, in this fitting step, the fitting step is simplified.

In the dust seal 50, the first bellows 72, the attaching portion 71, the bushing 60, the main seal lip 80, and the sub seal lip 90 are one component during assembly, resulting in a small number of components and a removal of a complex assembly process. Thus, the process for assembly of the dust seal 50 is simple.

Like the dust seal 1, the dust seal 50 is attached to the column hole 41 to seal the gap between the steering shaft 42, which is inserted through the column hole 41, and the column hole 41, thereby preventing foreign matter such as dust, rain, or the like from entering the vehicle interior. A lip tip 92 is in close contact with the outer peripheral surface 42*a* of the steering shaft 42, thus the sub seal lip 90 seals the gap between the bushing 60 and the steering shaft 42 from the inner side (vehicle interior side) (see FIG. 4). Since the usage state of the dust seal 50 is similar to that of the above-described dust seal 1, its detailed description will be omitted.

In the usage state, the dust seal 50 provides the same effects as the above-described dust seal 1.

To be specific, by the attaching portion 71 and the main seal lip 80, foreign matter such as dust, rain, or the like are prevented from entering the vehicle interior from the gap between the column hole 41 and the steering shaft 42. In addition, the sub seal lip 90 used in addition to the main seal lip 80 prevents leakage of the lubricant applied between the bushing 60 and the steering shaft 42.

In addition, the first bellows 72 and the bushing 60 are strongly joined to each other by vulcanization bonding, thereby providing high durability against load repeatedly applied to the joint between the first bellows 72 and the bushing 60 due to the movement of the bushing 60, and therefore, the release of the joint between the first bellows 72 and the bushing 60 can be restrained.

The attaching portion 71 and the first bellows 72 are integrally formed from the same material, thereby increasing the strength of the joint (the end portion 72*c*) between the first bellows 72 and the attaching portion 71, and therefore, the durability of the dust seal 50 against the load repeatedly applied to the joint can be increased.

In the dust seal body 70, to the attaching portion 71 and the first bellows 72, a material with high fatigue resistance is selected, therefore, the durability of the attaching portion 71 and the first bellows 72 against load repeatedly applied thereto can be increased.

The bushing 60 supports the steering shaft 42 with the inner peripheral surface extending lengthwise in the direction of the axis x, therefore, the bushing 60 can follow the movement of the steering shaft 42 and keep a stable position with respect to the steering shaft 42 even if the steering shaft 42 is largely off-center. Hence, it is possible to keep the contacting positions of the seal lips 80 and 90 to the steering shaft 42 a proper position.

In this way, like the dust seal 1, the dust seal 50 according to the second embodiment of the present disclosure can improve the fatigue resistance against repeated the expansion and contraction movement, therefore, it is possible to restrain damage to the dust seal body 70 due to the movement of the bushing 60. Hence, even in the event of an impact to the bushing 60, the risk of the detachment of the bushing 60 from the dust seal body 70 can be restrained sufficiently, the following ability of the bushing 60 to the steering shaft 42 can be maintained, and the positions of the seal lips 80 and 90 with respect to the steering shaft 42 can be kept a proper position. Therefore, the sealing performance of the main seal lip 80 and the sub seal lip 90 can be improved and maintained for a long period of time.

As described above, the dust seal 50 according to the present embodiment can simplify the assembly process thereof and can increase the bonding strength between the bushing 60 and the first bellows 72.

A modification of the dust seal 1 according to the first embodiment of the present disclosure will now be described with reference to FIG. 5. The modification is different from the dust seal 1 in the shapes of the bushing 10, the first bellows 22, and the second bellows 23. A component having a function that is the same as or similar to that of any component of the dust seal 1 will be denoted by the same reference numeral as that corresponding component and its description will be omitted. Components different from those in the dust seal 1 will be described.

Figure 5:
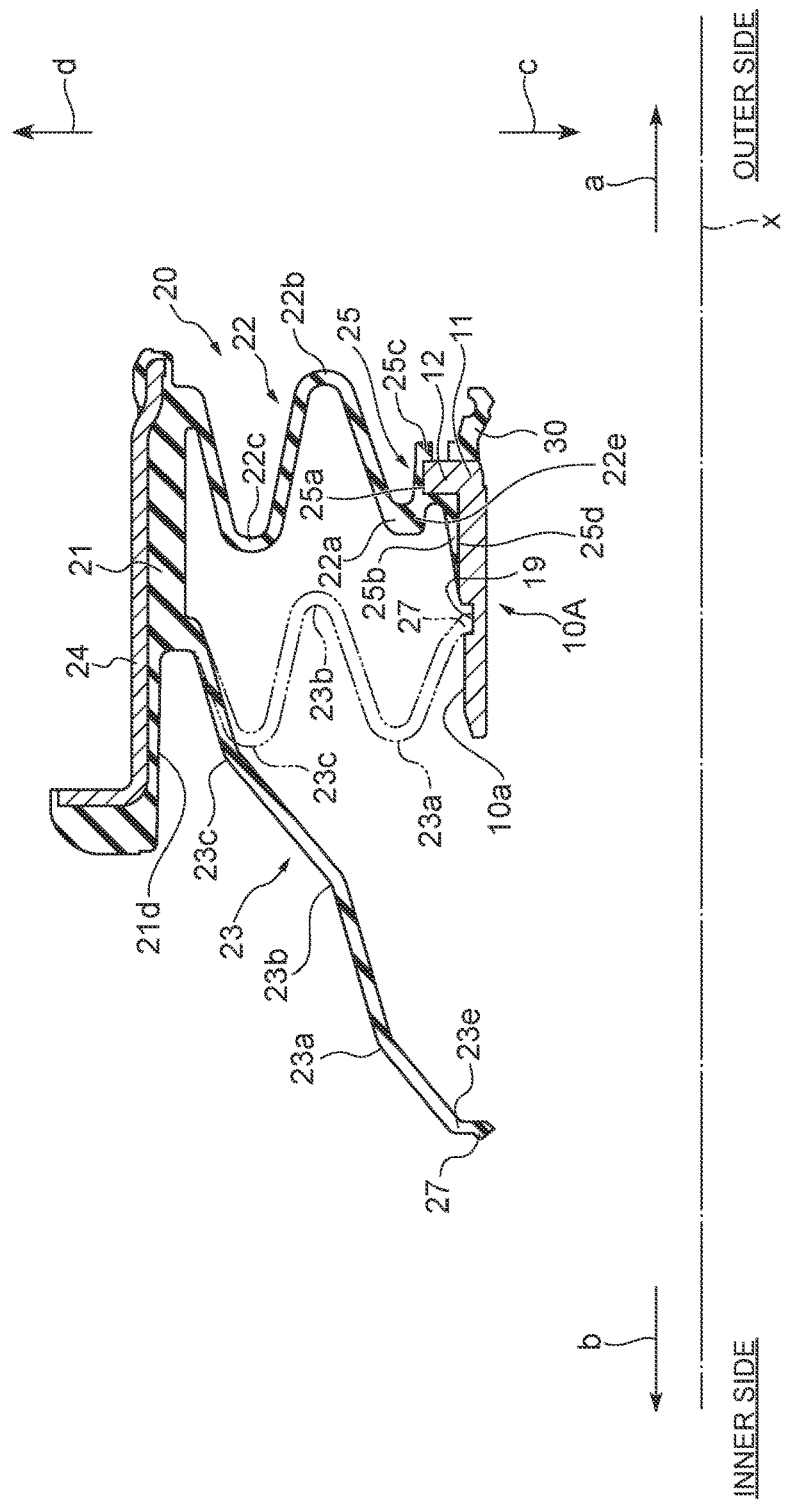
FIG. 5 is a partial cross-sectional view along the axis, showing a schematic structure of a modification of the dust seal according to the first embodiment of the present disclosure.
Figure 6:
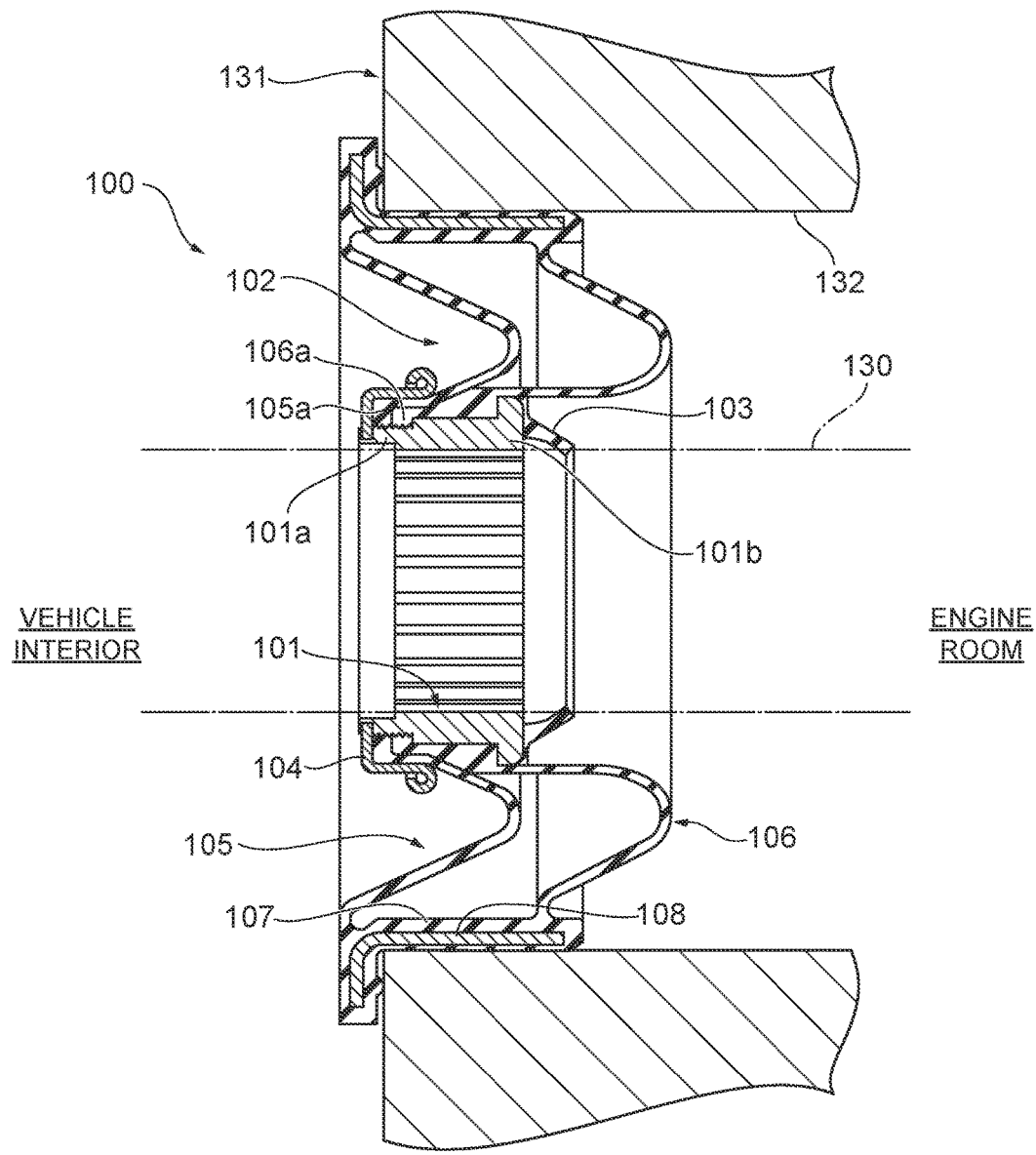
FIG. 6 is a cross-sectional view schematically showing a structure of a conventional dust seal.

FIG. 5 is a partial cross-sectional view along the axis x, showing the schematic structure of the modification of the dust seal 1 according to the first embodiment of the present disclosure. FIG. 5 shows the state before the second bellows 23 is engaged with a bushing 10A.

As shown in FIG. 5, unlike the bushing 10, the bushing 10A does not include the engaging part 17 but an annular trench 19 as a locking part. The trench 19 is formed on the outer peripheral surface 10a of the bushing 10A and is more on the inner side than the projection 12. The trench 19 is an annular trench depressed from the outer peripheral surface 10a of the bushing 10A toward the inner periphery side. The trench 19 has, for example, a rectangular cross section that allows a component accommodated in the trench 19 to be engaged therewith in the direction of the axis x.

In this modification, the first bellows 22 is used in a different mode. Specifically, the shape of the engaging part 25 is different. The engaging part 25 formed at the end portion 22e, which is the end portion of the first bellows 22 in the inner periphery side, has an annular depression 25a depressed toward the outer periphery side as described above. The depression 25a is defined by an annular inner side peripheral wall 25b, which is positioned on the inner side and projects toward the inner periphery side, and an annular outer side peripheral wall 25c, which is positioned on the outer side and projects toward the inner periphery side. The inner side peripheral wall 25b, in the cross section, extends in the direction of the axis x, and, as shown in FIG. 5, has, for example, a triangle shape extending longwise in the direction of the axis x and forms an inner peripheral surface 25d, which is a cylindrical surface, on the inner periphery side. This inner peripheral surface 25d extends longwise in the axis x direction and is in contact with the outer peripheral surface 10a of the bushing 10A and bonded thereto by vulcanization bonding. In this modification, the inner peripheral surface 25d of the inner side peripheral wall 25b extends from the inside end surface of the projection 12 to the outside end portion of the trench 19 and is bonded to the outer peripheral surface 10a of the bushing 10A in a long range in the direction of the axis x. The outer side peripheral wall 25c has a rectangular cross section, like the engaging part 25 of the first bellows 22 shown in FIG. 2.

In addition, in this modification, the mode of the second bellows 23 is different. Specifically, the engaging part at the end portion 23e is different from the aforementioned engaging part 26. In FIG. 5, the second bellows 23 is shown by the solid line in the state after the vulcanization molding in which the second bellows 23 has been molded such that the second bellows 23 extends diagonally from the inner peripheral surface 21d of the attaching portion 21 to the inner periphery side and the inner side, and shown by the virtual line in the usage state in which the second bellows 23 is locked to the bushing 10A.

As shown in FIG. 5, the end portion 23e of the second bellows 23 has a projecting tip 27 as an engaging part. The projecting tip 27 is formed such that it can be engaged with the trench 19 of the bushing 10A, is an annular portion projecting toward the inner side, and has a cross section shape, for example, a wedge shape projecting toward the inner side. In the free state of the second bellows 23 indicated by the solid line in FIG. 5, for the cross section shape of the projecting tip 27, the shape, in which the surface facing the outer periphery side extends from the base of the surface orthogonally with respect to the axis x or obliquely toward the outer periphery side is preferable. In the usage state, the second bellows 23 is bent toward the outer side, the projecting tip 27 of the second bellows 23 is fitted into the trench 19 of the bushing 10A, and the second bellows 23 is engaged and locked, and the second bellows 23 is joined and fixed to the bushing 10A. At this time, in the second bellows 23, the convex portions 23a and 23c, and the concave portion 23b are formed as indicated by the virtual line in FIG. 5. In this usage state, the second bellows 23 has elasticity given by the convex portions 23a and 23c, the concave portion 23b, and other components, therefore, the projecting tip 27 of the second bellows 23 does not come off the trench 19 and is pushed toward the inner periphery side in the trench 19. Thus, the projecting tip 27 of the second bellows 23 can be securely fitted into and engaged with the trench 19 of the bushing 10.

As described above, in this modification, the engaging part 25 of the first bellows 22 can be bonded by vulcanization bonding such that the engaging part 25 contacts the bushing 10A in a long range in the axis x direction via the inner peripheral surface 25d of the inner side peripheral wall 25b, in addition to the vulcanization bonding between the depression 25a and the projection 12 of the bushing 10A. Therefore, the contact area where the engaging part 25 of the first bellows 22 and the outer peripheral surface 10a of the bushing 10A can be increased and the bonding strength between the engaging part 25 of the first bellows 22 and the outer peripheral surface 10a of the bushing 10A can be increased. Therefore, occurrence of breaking off and damage of the first bellows 22, during release of a mold after the vulcanization bonding between the engaging part 25 of the first bellows 22 and the bushing 10A in the manufacturing of the dust seal 10, can be restrained because of the high bonding strength between the engaging part 25 of the first bellows 22 and the bushing 10A.

In addition, only once the second bellows 23 is bent and the projecting tip 27 is fitted in the trench 19 of the bushing 10A, the second bellows 23 can be engaged with and joined to the bushing 10A for fixation; thus, the engagement of the second bellows 23 with the bushing 10A can be simplified. Therefore, the assembly of the dust seal 1 can be simplified.

It should be noted that the projection 12 of the bushing 10A and the engaging part 25 of the first bellows 22, and the trench 19 of the bushing 10A and the projecting tip 27 of the second bellows 23 in this modification can also be used in the dust seal 2 according to the second embodiment of the present disclosure.

Although the embodiments of the present disclosure have been described, the present disclosure should not be limited to the aforementioned embodiments of the present disclosure and includes various modes included in the scope of the concept of the present disclosure and Claims. Moreover, the structures can selectively be combined as appropriate so that at least part of the above-described solution and effects can be provided. For example, the shape, material, position, size, and other conditions for each component in the above embodiments can be modified as appropriate according to the actual usage mode of the present disclosure. In particular, the shapes such as the attaching portions 21 and 71, the reinforcing ring 24, the seal lips 30, 80, and 90, the accordion shape of the first and second bellows 22, 23, 72, and 73 and other components should not be limited to the above-described shapes.

As described above, in the dust seal 1, the shapes of the engaging part 25 of the first bellows 22 and the corresponding projection 12 of the bushing 10 should not necessarily be limited to the above-described shapes and may have any shape that allows the first bellows 22 to be engaged with the bushing 10 and bonded thereto by vulcanization at the end portion on the inner periphery side. The engaging part 25 of the first bellows 22 and the corresponding projection 12 of the bushing 10 may be configured like the joint (the contact portion 74 and the outer periphery 60a) between the first bellows 72 and the bushing 60 of the dust seal 50.

Similarly, in the dust seal 50, the shapes of the contact portion 74 of the first bellows 72 should not necessarily be limited to the above-described shape and may be any shape that allows the first bellows 72 to be in contact or engaged with the bushing 60 and to be bonded thereto by vulcanization at the end portion on the inner periphery side. Moreover, the contact portion 74 of the first bellows 72 and the bushing 60 may be configured like the engaging part 25 of the first bellows 22 and the corresponding projection 12 of the bushing 10 in the dust seal 1.

Further, in the dust seal 1, the shapes of the engaging part 26 of the second bellows 23 and the corresponding engaging part 17 of the bushing 10 should not necessarily be limited to the above-described shape and may be any shape that allows the second bellows 23 to be engaged with the bushing 10 at the end portion on the inner periphery side.

Similarly, in the dust seal 50, the shapes of the engaging part 79 of the second bellows 73 and the corresponding engaging part 62 of the bushing 60 should not necessarily be limited to the above-described shapes and may be any shape that allows the second bellows 73 to be engaged with the bushing 60 at the end portion on the inner periphery side. Moreover, the shapes of the fitting part 76 of the second bellows 73 and the corresponding retention surface 71f of the attaching portion 71 should not necessarily be limited to the above-described shapes and may be any shape that allows the second bellows 73 to be fitted to the attaching portion 71 at the end portion on the outer periphery side.

Although the dust seals 1 and 50 according to the first and second embodiments of the present disclosure are used as a steering dust seal in a vehicle in the above description, the application of a dust seal of the present disclosure should not be limited thereto and the present disclosure can be applied to any structure that can use the effects of the present disclosure, such as industrial machines.

What is claimed is:

1. A dust seal for sealing a gap between an opening in a receiving member and a shaft inserted through the opening, comprising:
    a dust seal body in an annular shape centered about an axis;
    a bushing in an annular shape centered about the axis, through which the shaft is slidably inserted; and
    a seal lip in an annular shape centered about the axis, provided at one end of the bushing in a direction of the axis, and slidably contacting an outer peripheral surface of the shaft, wherein
    the dust seal body including:
        an attaching portion that is fitted into the opening of the receiving portion, is in an annular shape centered about the axis, and is made of an elastic material,
        a reinforcing ring bonded to the attaching portion by vulcanization,
        a first accordion unit that has an accordion made of an elastic material and is an annular shape centered about the axis, and
        a second accordion unit that has an accordion made of an elastic material and is an annular shape centered about the axis,
    the first accordion unit and the second accordion unit are arranged side by side in the direction of the axis,
    the first accordion unit is integral with the attaching portion, is joined to an inner peripheral surface of the attaching portion at an outer periphery, and is bonded to an outer peripheral surface of the bushing at an outer side by vulcanization so that the first accordion unit is attached to the bushing, and
    the second accordion unit is fixed to the inner peripheral surface of the attaching portion at an outer periphery, and engaged with the outer peripheral surface of the bushing at an inner side so that the second accordion unit is attached to the bushing,
    wherein the first accordion unit and the second accordion unit are attached to the bushing at different separate locations.

2. The dust seal according to claim 1, wherein the second accordion unit is integral with the attaching portion and joined to the inner peripheral surface of the attaching portion at the outer periphery.

3. The dust seal according to claim 1, wherein the second accordion unit is fitted into the inner peripheral surface of the attaching portion at the outer periphery and to thereby be fixed to the attaching portion.

4. The dust seal according to claim 1, wherein the bushing includes a first engaging part extending in an annular shape along the outer peripheral surface, the second accordion unit includes an annular second engaging part at an end portion, and the second accordion unit is locked to the outer peripheral surface of the bushing with the first engaging part and the second engaging part engaged with each other.

5. The dust seal according to claim 4, wherein the first engaging part includes a depression that extends in an annular shape along the outer peripheral surface of the bushing and that is depressed in the direction of the axis or toward the axis, the second engaging part includes a projection that extends in an annular shape at the end portion of the second accordion unit and that projects in the direction of the axis, the projection of the second engaging part is accommodated in and engaged with the depression of the first engaging part, and the second accordion unit is locked to the outer peripheral surface of the bushing.

6. The dust seal according to claim 5, wherein the bushing includes, at an end portion on a second accordion unit side in the direction of the axis, a tapered portion with a taper surface spreading from the end portion side toward an end portion side opposite to the end portion side.

* * * * *